United States Patent
Perelló Fort et al.

(10) Patent No.: US 12,527,649 B2
(45) Date of Patent: Jan. 20, 2026

(54) DEVICE FOR THE DIGITIZATION AND MANUFACTURING OF DENTAL MODELS

(71) Applicant: VOGUL, S.L.U., Andorra la Vella (AD)

(72) Inventors: Rubén Perelló Fort, Andorra la Vella (AD); Roberto Padrós Roldán, Andorra la Vella (AD); Guillem Tena Corts, Andorra la Vella (AD)

( * ) Notice: Subject to any disclaimer, the term of this patent is extended or adjusted under 35 U.S.C. 154(b) by 285 days.

(21) Appl. No.: 18/318,817

(22) Filed: May 17, 2023

(65) Prior Publication Data
US 2024/0325120 A1  Oct. 3, 2024

(30) Foreign Application Priority Data
Mar. 27, 2023  (EP) ..................................... 23164340

(51) Int. Cl.
| | |
|---|---|
| *A61C 8/00* | (2006.01) |
| *B33Y 10/00* | (2015.01) |
| *B33Y 30/00* | (2015.01) |
| *B33Y 80/00* | (2015.01) |

(52) U.S. Cl.
CPC ............ *A61C 8/0001* (2013.01); *B33Y 10/00* (2014.12); *B33Y 30/00* (2014.12); *B33Y 80/00* (2014.12)

(58) Field of Classification Search
None
See application file for complete search history.

(56) References Cited

U.S. PATENT DOCUMENTS

| | | | | |
|---|---|---|---|---|
| 6,135,773 A | * | 10/2000 | Lazzara | A61C 8/0001 433/213 |
| 2011/0294093 A1 | * | 12/2011 | Herweg | A61C 8/0001 433/172 |
| 2013/0289950 A1 | * | 10/2013 | Kopelman | A61C 13/0004 703/1 |
| 2014/0038135 A1 | * | 2/2014 | Kopelman | A61C 13/0004 433/213 |
| 2016/0089222 A1 | * | 3/2016 | Geier | A61C 13/34 433/213 |
| 2016/0128813 A1 | * | 5/2016 | Scharfe Thomsen | A61C 8/0001 433/213 |

(Continued)

FOREIGN PATENT DOCUMENTS

| | | | | |
|---|---|---|---|---|
| DE | 102012102059 A1 | * | 9/2013 | A61C 13/0022 |
| EP | 3552574 A1 | * | 10/2019 | A61C 13/0004 |

(Continued)

*Primary Examiner* — Heidi M Eide
(74) *Attorney, Agent, or Firm* — Egbert, McDaniel & Swartz, PLLC

(57) ABSTRACT

Device for the digitization and manufacturing of dental models, for replicating the cavity and position of the implant connection in plaster and digital 3D models, having an analog, a fixing element and a multipurpose accessory, as a reference when digitizing and as an aid when inserting the analog in and removing it from the model. The analog, the fixing element and the accessory are adapted for fixing the analog on the 3D printing model and/or connecting the analog to the accessory. The external surface of the analog combines cylindrical portions and flat vertical and horizontal faces, which define positioning surfaces, for use as a scan analog. And, for plaster models, the device includes a protective cover for the analog.

5 Claims, 4 Drawing Sheets

(56) References Cited

U.S. PATENT DOCUMENTS

| | | | |
|---|---|---|---|
| 2018/0263739 A1* | 9/2018 | Simmonds | A61C 8/0001 |
| 2020/0375708 A1* | 12/2020 | Andersen | A61C 8/0093 |
| 2021/0290350 A1* | 9/2021 | Xam-Mar Mangrane | A61C 13/0013 |
| 2022/0258322 A1* | 8/2022 | Boronkay | B25G 1/06 |

FOREIGN PATENT DOCUMENTS

| | | | | |
|---|---|---|---|---|
| KR | 20210141848 A | * | 11/2021 | A61C 8/0001 |
| KR | 102407250 B1 | * | 6/2022 | A61C 13/34 |
| KR | 102552919 B1 | * | 7/2023 | A61C 8/0001 |
| KR | 102561679 B1 | * | 7/2023 | A61C 8/008 |
| WO | WO-2018091505 A1 | * | 5/2018 | A61C 8/0001 |
| WO | WO-2019053306 A1 | * | 3/2019 | A61C 13/0004 |

* cited by examiner

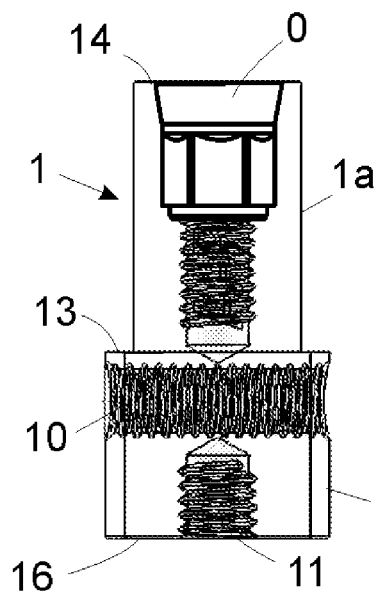
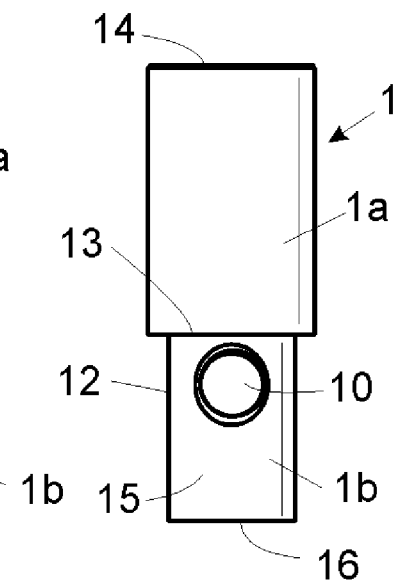
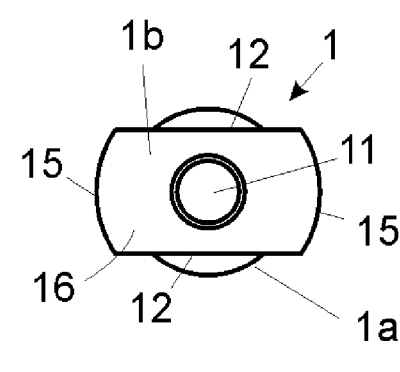
FIG. 1   FIG. 2   FIG. 3
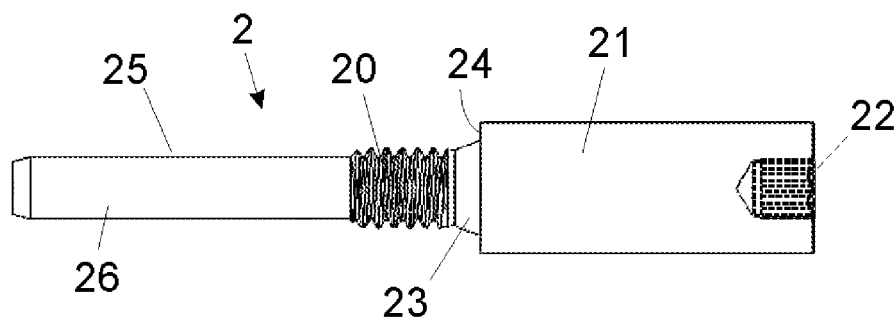
FIG. 4
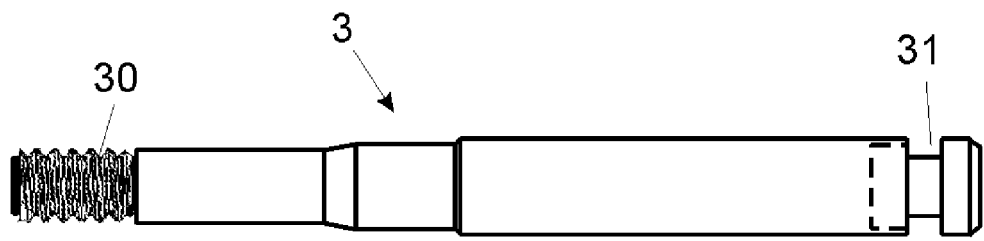
FIG. 5

DEVICE FOR THE DIGITIZATION AND MANUFACTURING OF DENTAL MODELS

CROSS-REFERENCE TO RELATED APPLICATIONS

Not applicable.

BACKGROUND OF THE INVENTION

1. Field of the Invention

The field of application of the present invention is framed within the sector of the industry dedicated to the manufacture of medical apparatus and devices, focusing particularly on the field of dentistry, and more specifically, on the manufacture of analogs and replicas for use in dental implantology.

2. Description of Related Art Including Information Disclosed Under 37 CFR 1.97 and 37 CFR 1.98

Since the early days of implant dentistry, an implant analog and a transfer device have been needed to replicate the patient's oral cavity and implant position on a master working model manufactured in plaster. With the advancement of technology and digital processes, models can be manufactured in 3D printing and the position of the analogs can be transferred through digital flow. The function of the scan analog is to make the prosthesis and the model through a digital flow, without the need to manufacture the model in plaster through the traditional impression taking method.

Different types of analogs and analog or scan analog systems are known in the market. However, they have several drawbacks, among which the following can be highlighted:

Existing implant analogs either have the scan analog function or the implant analog function for the master model, but do not combine the two functions in one device.

Existing implant analogs are designed to be used in working models manufactured in 3D printing or in models manufactured in plaster, but they do not combine the two functions in one device.

Existing implant analogs for the manufacturing of models in 3D printing do not have a system that prevents incorrect positioning by the user.

The existing replicas or analogs with analog scan function are designed to be scanned in an impression tray connected to the transfer posts. They do not have a specific retention system that would allow them to be used with already manufactured dental frameworks. Nor do they have the possibility of using this specific retention system to connect the dental structure/analog assembly to a contra angle and take advantage of the rotation functions to facilitate digitization.

The objective of the present invention is the development of an improved device that combines the three functions or possibilities of use of the analogs for 3D models, in plaster and scan analog systems in the same set, allowing for a widening of possibilities and versatility of use, which, in turn, translates into a reduction of costs for the physician, the laboratory and the patient, since steps in the execution of the different phases of realization can be avoided.

Additionally, and as a reference to the current state of the art, it should be noted that, at least on the part of the applicant, the existence of any other implant analog device for the digitization and manufacturing of dental models is unknown, which, with a similar application, has technical characteristics equal or similar to those of the implant analog device claimed herein.

More specifically, most known implant analogs consist simply of a cylinder, usually a titanium cylinder, which has on its coronal side a connection identical to that of the implant in the patient's mouth. There are also analogs with different shapes, depending on whether they are to be cast in plaster or in a 3D printed model.

Examples of analogs for 3D printing include the following:

The one marketed by the company ELOS MEDTECH, consisting of a cylinder with an angled end and concave notches on its perimeter surface.

The one marketed by the company NATHORGYR, also consisting of a cylinder which, in this case, has two portions of different diameters, one larger and shorter and the other smaller and longer, ending in a conical shape.

The one marketed by ADIN IMPLANTS, also consisting of a cylinder which, in this case, has grooves on its surface and a lower locking screw with a hexagonal connection and for a flat-head screwdriver.

The one marketed by the company DYNAMIC ABUTMENT SOLUTIONS, also in the form of a conical cylinder at one end and with a lower fixing screw.

Finally, the same company DYNAMIC ABUTMENT SOLUTIONS markets another implant analog or replica for scan function which, in this case, is a cylinder with a portion of its surface being flat, but which does not have any type of fixing screw, as it is designed for digitization.

BRIEF SUMMARY OF THE INVENTION

The invention, as expressed in the wording of the description herein, refers to a device for digitizing and manufacturing dental models that provides, to the function for which it is intended, advantages and features which are described in detail below, that represent an improvement of the current state of the art within its field of application.

More particularly, the object of the invention focuses on a device which, consisting of a set of elements, namely an implant analog or replica, a fixing element such as a screw and a multipurpose accessory such as a contra angle, is intended to replicate the cavity and the position of the connection of an implant on a master working model or dental model. This device has the advantageous particularity of being designed with an improved structural configuration that allows it to be used in a polyvalent way, since it is suitable both for the digitization of the implant position, known in the sector as a "scan analog", for the manufacture of dental models in 3D technology or for the manufacturing of dental models by means of the traditional plaster system.

The device for the digitization and manufacture of dental models proposed by the invention is an optimal solution for satisfactorily achieving the above-mentioned objectives, with the characterizing details which make it possible and distinguish it being conveniently set forth in the final claims accompanying the present description.

Specifically, what the invention proposes, as noted above, is a device consisting of a set comprising an implant analog or replica, a fastening element and a multipurpose accessory, which has the advantage of being suitable for replication of the cavity and the position of the connection of an implant both in a real working master model, in 3D or plaster, and in a digital one, since it is designed with an improved structural configuration that allows its use in a multipurpose way in the three types of model. More specifically, on the one hand, the implant analog body and the attachment element are provided with fixing means to be able to fix the analog in the 3D printing model and to be able to connect the analog to the accessory, preferably consisting of a contra angle. And, on the other hand, in order to facilitate the digitization process and widen the possibilities of use, the analog body has an external surface with a series of positioning geometries, namely a series of flat vertical and horizontal parts, which confer the analog function of scan analog or for use with digitized models. In addition, the implant analog can be mounted with an analog protector and be used in the manufacture of plaster models without damage to the scannable surface.

For this purpose, and more specifically, the implant analog consists of a body composed of two parts or guiding cylinders, a totally cylindrical upper part of a smaller diameter, with the connection for the implant in its upper part, and another lower part of a greater diameter which, instead of being totally cylindrical, has two opposite cylinder sector faces interposed between two flat ones that define two vertical flat faces of rotational positioning, with the perimetral surface being the one that defines a horizontal flat face of vertical positioning, with said flat faces being the positioning and orientation surfaces that are functional both for the digital analog function and for the scan analog function.

Furthermore, internally, the lower part of the analog body is provided with holes, one transverse and the other vertical, with fixing means for connecting the fastening element and the multipurpose accessory. Preferably, as said, the fastening element is a screw, in which case one of said holes is a transverse threaded through-hole, where the fastening screw is connected, and the other hole, preferably, is a threaded vertical hole in the lower part where the accessory is connected, which, preferably, is a contra angle. In any case, the transverse hole for the attachment of the fixing element is located in the lower part of the analog, i.e. with an inlet and outlet through the respective cylindrical areas, to allow centering the position to the model during attachment with said screw or fastening element, allowing the analog to be inserted to the model in one or more positions.

The configuration of the analog body described has the functions of an implant analog for manufacturing real 3D or plaster models and for an implant scan analog.

In the implant analog function, it can be used for the manufacturing of conventional plaster models and the manufacturing of models designed through 3D printing. The design of the analog, together with the attachment system for models in 3D printing, ensures correct positioning and orientation of the analog and prevents incorrect positioning by the user.

For the scan analog function, the implant analog has the aforementioned orientation surfaces defined by the respective vertical and horizontal flat faces that allow capturing the position and orientation of the implant during the digitizing process.

For the analog function in the manufacture of plaster models, as noted above, the analog will have a protective cover to prevent damage to the scannable surface.

In a preferred embodiment, in which the fastening element is a screw, it is provided with a cylindrical head, with a machined hole at its end for inserting a tool, for example a hexagon hole for inserting an Allen wrench, and exerting a tightening force, a tapered seat or other specific surface, for centering the screwing position, a flat face perimetral to said conical seat, with a stop function, and a portion with thread or other fixing means, for mechanical fixing of the implant analog to the model, and a tip for guiding and securing the position/orientation of the analog in the models manufactured in 3D printing. The tip, preferably cylindrical, allows the user to verify the correct position of the analog in the model and avoid incorrect use, as it protrudes on the opposite side of the transverse through-hole of the analog.

Finally, the multi-purpose accessory, which as has been pointed out is preferably a contra angle, is a tip equipped with a thread or other fastening system at its upper end, to fix and connect to the analog in the vertical thread of its lower part, and a universal Contra Angle connection at its opposite or lower end, to connect to a handling tool. This accessory has two applications, the first is to take advantage of the functions of the contra angle to digitize dental structures with reference to the position of the implant, and the second is to use the tip to help insert the analog in and remove it from the model manufactured in 3D printing.

The device, with the described attachment system in 3D printing models, allows preserving and replicating as much as possible the impression (analog or digital) of the patient's oral cavity. The device allows centering the position and orientation of the analog in all axes in the model through different elements designed in the analog body, the fixing screw and the housing generated in the model for the insertion of the analog (digital library). In turn, the device allows the user to identify and correctly use the implant analog and screw assembly. The digital library has 3D files designed with the same geometry as the physical analog and which are installed in the design software to generate the housing for the insertion of the analog in 3D printing models.

The designed implant analog allows performing the functions of analog and scan analog in the same device.

The design of the analog and the other elements of the device (especially the fixing element/digital library/and the protective cover) allow the device to be used both for the manufacturing of models using a conventional method and the manufacturing of models using 3D printing.

The design of the analog, the fixing element and the system for attaching the implant analog to the 3D printed model allow the user to verify the correct position before exerting the screwing force and hence ensure the correct position and orientation. For this purpose, the design of the fixing element's tip and a housing in the printed model are used to create an axis for verification and orientation of the entire system.

The inclusion of a vertical hole with thread or other fixing means in the lower part allows connecting an accessory through this fixing means. Said accessory allows scanning the analog and the structure, leaving free the whole functional area. The inclusion of this lower space also makes it possible to connect the contra angle accessory with thread or other fixing system to perform the digitizing processes taking advantage of its rotational functions.

The rotational movement allows fixing the intraoral scanner in one position and rotation of the structure to capture all the information of the structure and the implant analog. This will provide more reliable information on both tooth morphology and the position of the implant analog.

The fact that the implant analog has an analog scan function and can be mounted on and dismounted from the working model without changing the original position, makes it possible to improve the clinical laboratory workflow and establish new simplified work protocols without having to retake a conventional impression or a digital impression.

BRIEF DESCRIPTION OF THE SEVERAL VIEWS OF THE DRAWINGS

To complement the description being made herein and to assist in a better understanding of the characteristics of the invention, the present description is accompanied, as an integral part of the same, by drawings in which the following has been illustrated for illustrative and non-limiting purposes:

FIG. 1 shows a schematic front elevation and cross-section view of an example of the implant analog comprising the device, object of the invention, and more specifically an example with threaded holes as means of attachment, showing its general configuration and different internal parts.

FIGS. 2 and 3 show two views, namely lateral elevation and lower plan views, respectively, of the implant analog of the device of the invention, according to the example shown in FIG. 1.

FIGS. 4 and 5 show respective elevation views of the screw as a fastening element and of the contra angle as an accessory making up the device of the invention in an option thereof, showing the configuration of both elements.

DETAILED DESCRIPTION OF THE INVENTION

Figures 6, 7:
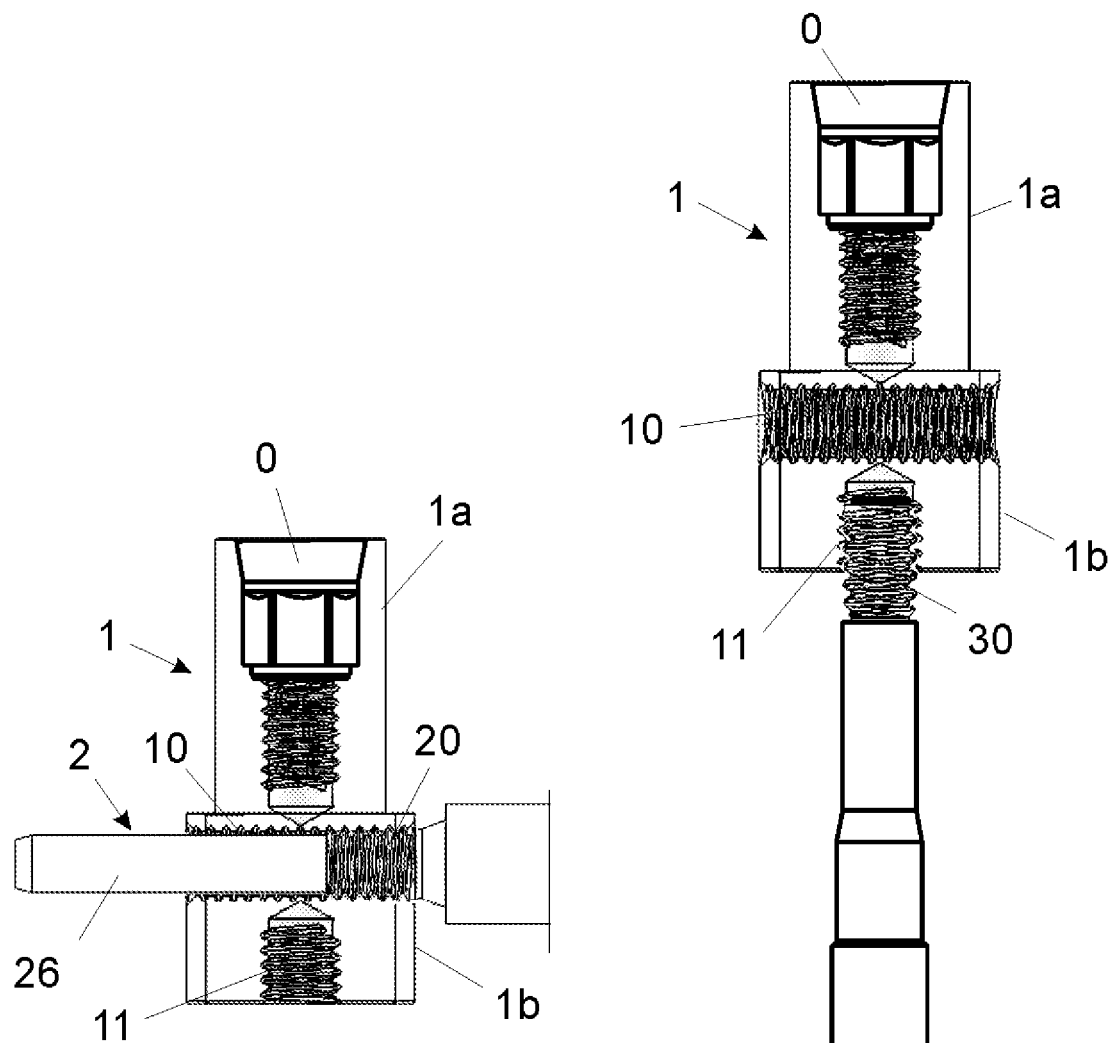
FIG. 6 shows a front elevation view and section of the implant analog with the attachment screw inserted, showing its transverse arrangement.
FIG. 7 shows a front elevation and cross-section view of the implant analog with the contra angle accessory inserted, showing the vertical arrangement of the same.

In view of the aforementioned figures, and in accordance with the adopted numbering, it can be observed therein two non-limiting embodiment examples of the device of the invention for the digitization and manufacture of dental models of the invention, comprising what is described in detail below.

Thus, as can be seen in said figures, the device of the invention, suitable for the replication of the cavity and the connection (0) position of an implant, both in a master working model (m) manufactured with 3D printing or plaster technology and in a digital model, essentially comprises an implant analog body (1), a fixing element (2) and an accessory (3) for multipurpose use, as a reference element when digitizing dental structures, and to assist in inserting the analog (1) in the model (m) manufactured in 3D printing, wherein said analog body (1) is provided with holes (10, 11) with fixing means and said fixing element (2) and accessory (3) are provided, respectively, with complementary fixing means (20, 30) allowing attachment of the analog (1) on the 3D printing model (m) and/or connection of the analog (1) to the accessory (3), and wherein the analog body (1), moreover, has an external surface combining cylindrical portions and flat vertical (12) and horizontal (13) faces, defining positioning surfaces, which allow its use with digitized models and its use as a scan analog.

As can be seen in FIGS. 1 to 3, preferably, the implant analog body (1) consists of a body composed of parts (1a, 1b) or guiding cylinders; namely:
- an upper part (1a) with a completely cylindrical external surface, the upper end of which (14) incorporates the machining of the connection (0) for the implant,
- and a lower part (1b), whose external surface has two curved surface portions (15) on diametrically opposite sides, in the shape of a circular sector with a greater radius than that of the cylinder of the upper part (1a), and two portions defining two vertical flat faces (12), on opposite sides interposed with the curved portions (15), which in turn determine a smaller width of said lower part (1b) than the diameter of the upper part (1a), with the vertical flat faces (12) acting as rotational positioning surfaces of the analog (1),
- there is, in turn, between both parts (1a, 1b) a flat horizontal face (13), defined by the perimeter surface generated by the difference in diameter between the upper part (1a) and the lower part (1b), which acts as a vertical positioning surface of the analog (1).

Furthermore, the lower part (1b) of the analog body (1) has internally a transverse through-hole (10), suitable for inserting and fixing the fastening element (2), and a vertical hole (11) open at the lower end (16) of said lower part (1b) suitable for connecting the accessory (3).

Preferably, the transverse through-hole (10), is located with an inlet and outlet in the respective curved portions (15) of said lower part (1b) of the analog (1), to allow centering the position to the model (m) during fastening with the fixing element (2) and to allow the analog (1) to be inserted to the model (m) in different positions.

Figure 13:
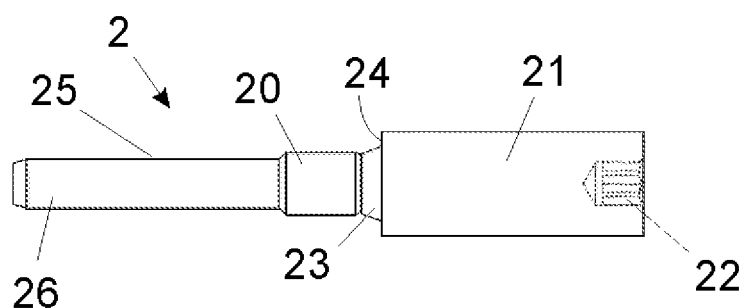
Figure 14:
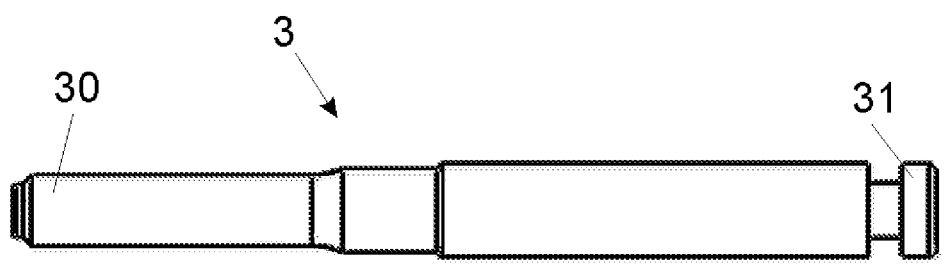

Referring to FIGS. 4 and 13, it can be seen how, preferably, the fixing element (2), comprises a head (21), with a machined hole (22) at its end, for inserting a tightening tool, a centering surface (23), for centering the fixing position, a flat perimeter face (24) between the head (21) and the centering surface (23) with a stop function, and a shaft (25) with complementary fixing means (20) for mechanical fixing of the analog (1) to the model (m), and a tip (26) for guiding and securing the position/orientation of the analog (1) on the models (m) manufactured in 3D printing.

In an embodiment, as shown in FIGS. 1 to 7, the fastening means of the holes (10, 11) of the analog (1) and the complementary fastening means (20, 30) of the fixing element (2) and of the accessory (3) for fastening said analog (1) to the model (m) and connecting the attachment (3) consist of threads.

Thus, in said embodiment, the transverse through-hole (10) is internally threaded for the coupling of the fixing element (2), and said fixing element (2) is a screw with a threaded portion (20) as a complementary fastening means.

Referring to FIG. 4, it can be seen how, preferably, the fixing element (2) in the form of a screw, comprises a cylindrical head (21), with a machined hole (22) at its end, preferably of a hexagon configuration, for inserting the tightening tool, a tapered seat as a centering surface (23), a flat perimeter face (24) between the head (21) and the tapered seat (23) with a stop function, while on the shaft (25) it has a threaded portion (20), for mechanical fixing of the analog (1) to the model (m), and a cylindrical tip (26) to guide and secure the position/orientation of the analog (1) in the models (m) manufactured in 3D printing. FIG. 6 shows the attachment of the screw (2) on the analog (1) and FIG.

10 shows the attachment of the analog (1) on the 3D printing model (m) with said fixing screw (2).

Furthermore, for the function of the analog (1) in the manufacture of plaster models, the device comprises the use of a protective cover (not shown in the figures) which the analog (1) is provided with to prevent deterioration of the scannable surface, especially the flat vertical (12) and horizontal (13) faces, which define respective rotational and vertical positioning surfaces, in its use as a scan analog.

Referring to FIG. 5, it can be seen how, on its part, in the aforementioned implementation option with threads as means of attachment, the vertical hole (11) open at the lower end (16) of the lower part (1b) of the analog (1) for connecting the accessory (3) is internally threaded and said accessory (3) comprises a complementary thread (30) at its end.

In any case, preferably, the accessory (3) is a contra angle consisting of a cylindrical piece in an elongated or pointed shape provided, at one end, with a thread and other complementary fixing means (30) suitable for fixing and connecting to the analog (1) in the vertical hole (11) of the lower end (16) of the lower part (1b) of said analog (1), and provided, at its opposite end, with a universal connection (31) for connecting to a handling tool. This accessory (3) is of multipurpose use since it has two applications, the first is to take advantage of the functions of the contra angle to digitize dental structures with reference to the position of the implant, and the second is to use the tip to help insert the analog (1) in and remove it from the model (m) manufactured in 3D printing from the lower part of the same.

Figure 8:
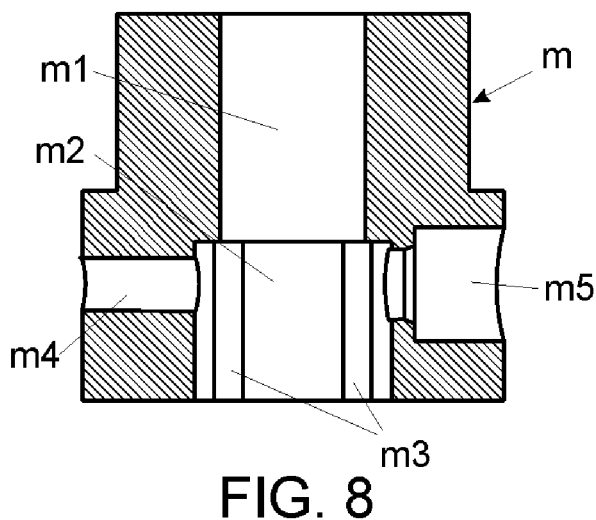
FIGS. 8 and 9 show elevation and cross-section plan views, respectively, of an example of a 3D printing model for the incorporation of the device of the invention with the fastening screw, shown without incorporation.
Figure 9:
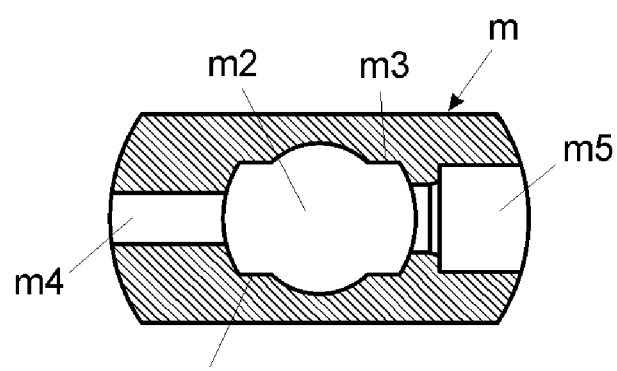
Figure 10:
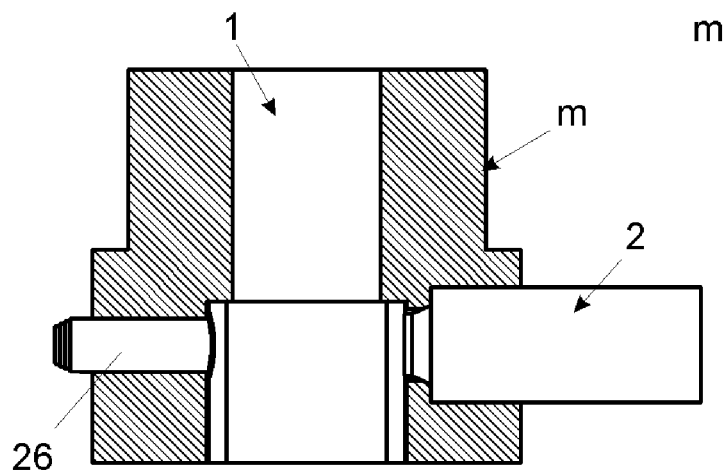
FIGS. 10 and 11 show cross-section elevation and plan views of the model shown in FIGS. 8 and 9, in this case represented with the analog and the fastening screw incorporated, showing its mode of use.
Figure 11:
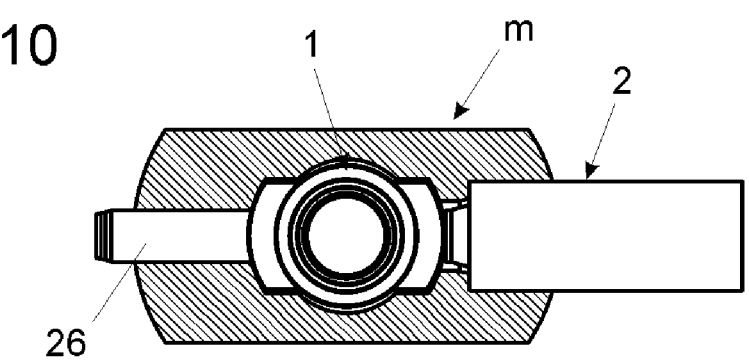
Figure 12:
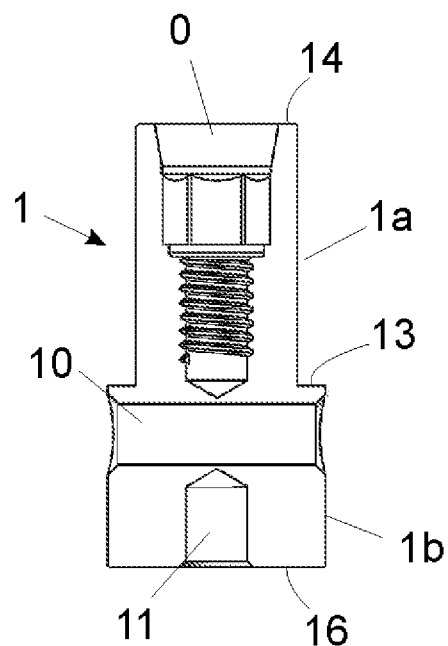
FIGS. 12, 13 and 14 show respective views of the implant analog, of the fastening element and of the accessory making up the device, in this case in an example of the same without a thread as fastening means.

Finally, in FIGS. 8 and 9, an example of a model (m) made by 3D printing can be observed, to incorporate the analog (1) and the fixing screw (2) of the device object of the invention, for which, said model (m) internally defines two vertical cylindrical holes, a smaller upper one (m1) and a larger lower one (m2) and with two flat walls (m3), as well as two transverse cavities, a smaller one (m4) for the cylindrical tip (26) of the screw (2) and a larger one (m5) for the cylindrical head (21) of the screw (2). And, FIGS. 10 and 11 show the arrangement of said analog (1) and of the fastening screw (2) once placed in the model (m).

Having sufficiently described the nature of the present invention, as well as the manner in which it can be implemented, it is not considered necessary to expand on the explanation for any person skilled in the art to understand its scope and the advantages derived therefrom, it being noted that, within its essentiality, it may be implemented in other embodiments which differ in detail from the one indicated by way of example, and to which the protection claimed will also apply provided that its fundamental principle is not altered, changed or modified.

We claim:

1. An apparatus for digitizing and manufacturing a dental model so as to replicate a cavity and a position for connection of an implant, the apparatus comprising:

an implant analog body having an external surface, the implant analog body having a cylindrical upper part that has an upper end with a machined connection for the implant and a cylindrical lower part wherein the external surface has a pair of curved surfaces respectively on diametrically opposite sides, each of the pair of curved surfaces defining a circular sector with a radius greater than a radius of said cylindrical upper part, the pair of curved surfaces respectively defining a pair of vertical flat faces on opposite sides of said lower part, the pair of vertical flat faces being rotational positioning surfaces of the implant analog body, the pair of vertical flat faces having a transverse through-hole internal thereof and a vertical hole open at a lower end of the lower cylindrical part, each of the transverse through-hole and vertical hole having fixing means, wherein a flat horizontal face is formed between said cylindrical upper part and said cylindrical lower part, the flat horizontal surface being defined by a perimeter surface, the perimeter surface defined by a difference in diameter between said cylindrical upper part and said cylindrical lower part, the flat horizontal surface being a vertical positioning surface for a digitized model and a scan analog;

an accessory adapted for multipurpose use, said accessary having fixing means complementary to the fixing means of the vertical hole so as to allow for attachment to the fixing means of the vertical hole; and a fixing element having fixing means complementary to the fixing means of the transverse through-hole so as to allow for attachment to the fixing means of the transverse through-hole.

2. The apparatus of claim 1, wherein the transverse through-hole has an inlet and an outlet in the respective pair of curved surfaces of said lower part, the inlet and the outlet adapted to allow a centering of a position of the three-dimensional printed model.

3. The apparatus of claim 1, wherein the fixing element has a head with a machined hole at an end thereof, the machined hole adapted to receive a tightening tool therein, the fixing element having a centering surface and a perimeter flat face between the head and the centering surface, the fixing element having a rod and a tip, the rod adapted to mechanically fix the analog to the three-dimensional printed model, the tip adapted to guide and secure a position or orientation of the analog in the three-dimensional printed model.

4. The apparatus of claim 1, wherein each of the fixing means comprise respective threads.

5. The apparatus of claim 1, wherein said accessory has a cylindrical piece with an elongated or pointed shape wherein the fixing means are adapted to connect to the analog, the cylindrical piece having an opposite end adapted to connect to a handling tool.

* * * * *